(12) United States Patent
Brunner et al.

(10) Patent No.: US 8,311,355 B2
(45) Date of Patent: Nov. 13, 2012

(54) SKIN TONE AWARE COLOR BOOST FOR CAMERAS

(75) Inventors: Ralph Brunner, Cupertino, CA (US); Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 831 days.

(21) Appl. No.: 12/479,651

(22) Filed: Jun. 5, 2009

(65) Prior Publication Data

US 2010/0309336 A1    Dec. 9, 2010

(51) Int. Cl.
G06K 9/40   (2006.01)
G06K 9/00   (2006.01)

(52) U.S. Cl. ........................ 382/254; 382/167; 348/222.1

(58) Field of Classification Search ........................ None
See application file for complete search history.

(56) References Cited

U.S. PATENT DOCUMENTS

| | | | | |
|---|---|---|---|---|
| 5,450,216 A * | 9/1995 | Kasson | ........................ | 358/518 |
| 5,682,443 A * | 10/1997 | Gouch et al. | ................... | 382/254 |
| 6,263,101 B1 * | 7/2001 | Klein | .............................. | 382/162 |
| 6,332,033 B1 | 12/2001 | Qian | | |
| 6,337,925 B1 * | 1/2002 | Cohen et al. | ................... | 382/199 |
| 6,340,994 B1 * | 1/2002 | Margulis et al. | .............. | 348/625 |
| 6,545,685 B1 * | 4/2003 | Dorbie | ............................ | 345/582 |
| 6,643,398 B2 | 11/2003 | Moriwaki | | |
| 6,661,916 B2 * | 12/2003 | Yang et al. | ..................... | 382/167 |
| 6,667,826 B1 * | 12/2003 | Hartley et al. | ................. | 359/278 |
| 6,704,444 B2 * | 3/2004 | Yagishita et al. | ............. | 382/167 |
| 6,721,064 B1 | 4/2004 | Huang et al. | | |
| 6,734,921 B1 * | 5/2004 | McIntyre et al. | ............. | 348/708 |
| 6,845,181 B2 | 1/2005 | Dupin et al. | | |
| 6,956,967 B2 * | 10/2005 | Gindele et al. | ................ | 382/167 |
| 6,983,081 B2 * | 1/2006 | Chen | .............................. | 382/284 |
| 7,092,573 B2 | 8/2006 | Luo et al. | | |
| 7,218,418 B2 * | 5/2007 | Curry et al. | ................... | 358/3.08 |
| 7,319,798 B2 * | 1/2008 | Kim et al. | ...................... | 382/285 |
| 7,336,277 B1 * | 2/2008 | Clark et al. | ..................... | 345/426 |
| 7,463,789 B2 * | 12/2008 | Myochin | ........................ | 382/284 |
| 7,609,307 B2 * | 10/2009 | Tsai et al. | ...................... | 348/273 |
| 7,652,701 B2 * | 1/2010 | Osada et al. | ................... | 348/275 |
| 7,953,275 B1 * | 5/2011 | Wolfram | ........................ | 382/167 |
| 7,970,206 B2 * | 6/2011 | Harris et al. | ................... | 382/162 |
| 2001/0010735 A1 * | 8/2001 | Yang et al. | ..................... | 382/162 |
| 2003/0072484 A1 * | 4/2003 | Kokko et al. | ................... | 382/155 |
| 2007/0110305 A1 | 5/2007 | Corcoran et al. | | |
| 2007/0229863 A1 | 10/2007 | Ono et al. | | |
| 2008/0056605 A1 | 3/2008 | Shehata et al. | | |

* cited by examiner

*Primary Examiner* — Manav Seth
(74) *Attorney, Agent, or Firm* — Wong, Cabello, Lutsch, Rutherford & Brucculeri, LLP

(57) ABSTRACT

Increasing color saturation and contrast in images generally leads to more pleasing images; however, doing so uniformly to all colors in the image can make skin tones appear with an overly red tint. One embodiment of an improved method of skin tone aware color boosting identifies areas of the image which look like skin tones and areas that do not look like skin tones. A blurred "skin tone mask" can then be created over the image. One large boost operation and one small boost operation can be applied to the image. A final version of the image may then be created, applying the pixel values resulting from the small boosting operation to the skin tone regions and applying the pixel values resulting from the large boosting operation to the non-skin tone regions, using the blurred mask to provide a smooth transition between the skin tone and non-skin tone regions.

25 Claims, 11 Drawing Sheets

Create "Mask"

SKIN TONE AWARE COLOR BOOST FOR CAMERAS

BACKGROUND

The digital image sensor, such as a charged coupled device (CCD), of a digital camera has a plurality of photo-sites arranged in a colored filtered array or pattern, such as a RGB Bayer pattern. In the RGB Bayer pattern, each photo-site is filtered so that it is receptive to either: red, green, blue, or some variation thereof. The type of colored filter array and digital imaging sensor varies typically based on the manufacture of the digital camera. For example, some color filtered arrays use a pattern of yellow, cyan, green, and magenta. Typically, the digital camera has an image pipeline that performs a demosaicing or de-Bayering process on the image, lens correction, and noise reduction. The image pipeline may then perform an RGB contrast and saturation "boost" on the image data before encoding the image into the YCbCr family of color spaces or other format suitable for displaying and viewing.

Various considerations must be addressed when processing a digital image obtained with a digital camera or other imaging device. One consideration involves preserving the spatial quality and the detail of the digital image, while another consideration involves sufficiently representing the color of the digital image. In many ways, these two considerations are interrelated.

One well-known problem with performing a color "boost" operation on a digital image is that it can often have an undesirable affect on areas of the image where skin tones are present. Specifically, skin tones appear to be especially susceptible to boost operations introducing visually unappealing artifacts to the image. For example, certain lighting conditions can give skin tones an over-saturated, unnatural look when boosted. The result is that skin tones appear to have a strong orange, yellow, magenta, or red glow-while the rest of the image appears normally.

SUMMARY

Conventional image boosting techniques that do not distinguish between skin tone and non-skin tone regions of an image can result in the visually unappealing presentation of human skin tones in certain scenes or light levels. Thus, there is need for a low computational cost, efficient skin tone aware color boosting algorithm for cameras that automatically detects the skin tone and non-skin tone regions of an image and adjusts the color boost in the two regions accordingly to create more visually appealing photos.

Increasing color saturation and contrast in images generally leads to more pleasing images; however, doing so uniformly to all colors in an image can make human skin tones appear with an overly orange, yellow, magenta, or red tint. One embodiment of an improved method of skin tone aware color boosting described herein operates by identifying areas of the image which look like skin tones through the use of a function that contains the proximity of the image's color to a predetermined "skin tone polygon" or "skin tone wedge" in the CbCr color space.

A "skin tone mask" can then be created over the image, covering each sampled value, and classifying each sampled value as either part of the "skin tone mask," e.g., assigning it a value of '1' or not a part of the skin tone mask, e.g., assigning it a value of '0'. The skin tone mask may then be blurred, e.g., using a Gaussian blur, which may be a Fast Gaussian blur, to account for outliers and holes in the mask and to soften the boundary between the skin tone and non-skin tone regions of the image.

Two separate color boosting operations may be applied to the entire image. In one embodiment, at least one of the boosting operations may be done in a different component of the color space than the masking operation. Typically, one color boosting operation will have a smaller effect on the image, and the other color boosting operation will have a larger effect on the image. Finally, the blurred mask may be used to create a final boosted version of the image, applying the pixel values resulting from the smaller boosting operation to the skin tone regions of the image and applying the pixel values resulting from the larger boosting operation to the non-skin tone regions of the image, using the blurred mask to provide a smooth transition between the skin tone and non-skin tone regions.

Many digital cameras and digital video cameras for embedded consumer devices provide image data in sub-sampled YCbCr color space to save memory bandwidth. For example, with so-called 4:2:0 sub-sampling, Cb and Cr are sampled at half the vertical and half the horizontal resolution of Y, resulting in one fourth the number of chroma samples as luma samples for a given region of an image. Thus, working directly in the CbCr color space to identify skin tone regions and build the image mask avoids the need for format conversions and reduces the amount of data that needs to be processed to build the mask by approximately six times compared to full RGB sampling. The automatic segmentation of the image into skin tone and non-skin tone regions via a predetermined "skin tone wedge" in CbCr space can be efficiently implemented through the use of vector processing. Because the method is fully automatic, no user interface is needed.

For still image cameras and video cameras in embedded devices to produce more visually pleasing images, methods such as this one are helpful to improve image quality, especially in areas of images that represent human skin tone regions.

DETAILED DESCRIPTION

This disclosure pertains to an apparatus, computer useable medium, method, and processor programmed to perform skin tone aware color boosting based on using blurred masks and predetermined skin tone ranges to create more visually appealing images. While this disclosure discusses a new technique for skin tone aware color boosting in digital camera images, one of ordinary skill in the art would recognize that the techniques disclosed may also be applied to other contexts and applications as well. The techniques disclosed herein are applicable to any number of consumer electronic devices with digital image sensors such as, for example, digital cameras, digital video cameras, mobile phones, personal data assistants (PDAs), portable music players, and computers. An embedded processor, such a Cortex-A8 with the ARMv7-A architecture, provides a versatile and robust computing unit for carrying out the disclosed techniques.

Figure 1:
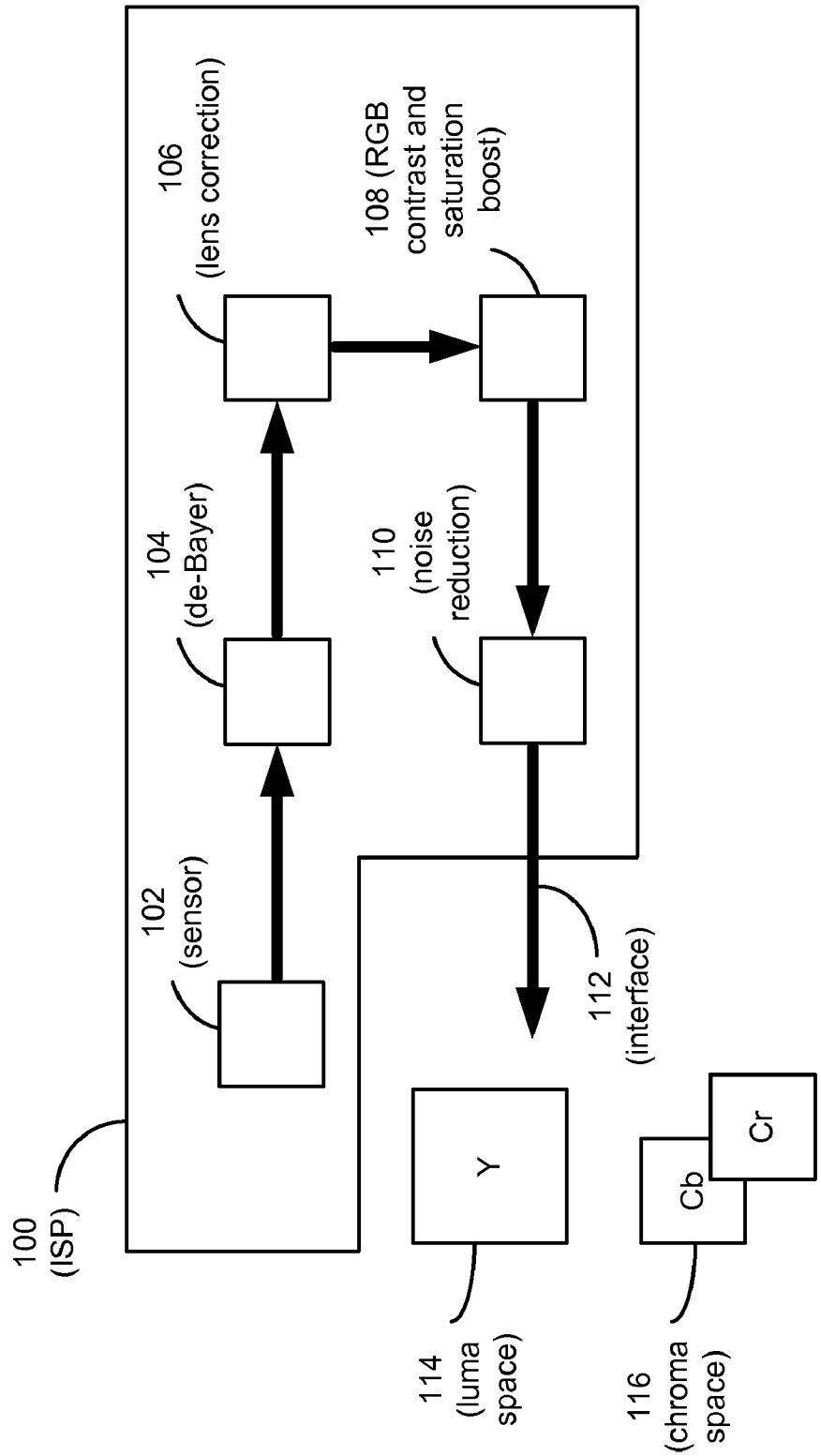
FIG. 1 illustrates a prior art image sensor package in accordance with one embodiment.

Referring to FIG. 1, a block diagram of one embodiment of a prior art image sensor package (ISP) 100 embedded in a processing unit 141 is shown. The ISP 100 may include a digital image sensor 102, such as a CCD. Digital image sensor 102 may send its image information to a demosaicing or de-Bayering process 104, as is well known in the art. Next, the ISP may perform lens correction 106 to correct the image for various lens distortions including vignetting artifacts, i.e., light fall-off towards the edges of the frame, and color uniformity. The image data may then be sent to an RGB contrast and saturation boost process 108, which, as is known in the art, shifts the midpoint of a color range without affecting the black or white points. The data may then be passed through noise reduction filter 110 to remove any "noise" pixels caused by low light conditions, for example. Finally, the image data may be encoded into the YCbCr family of color spaces and passed over interface 112 for any further processing and/or display by the digital camera. In YCbCr color space, the Y 114 stands for the luminance signal, i.e. brightness, the Cb stands for the "blue difference" chroma component, i.e. B-Y, and the Cr stands for the "red difference" chroma component, i.e., R-Y. The Cb and Cr values together are known as the "chroma space" 116.

Figure 2:
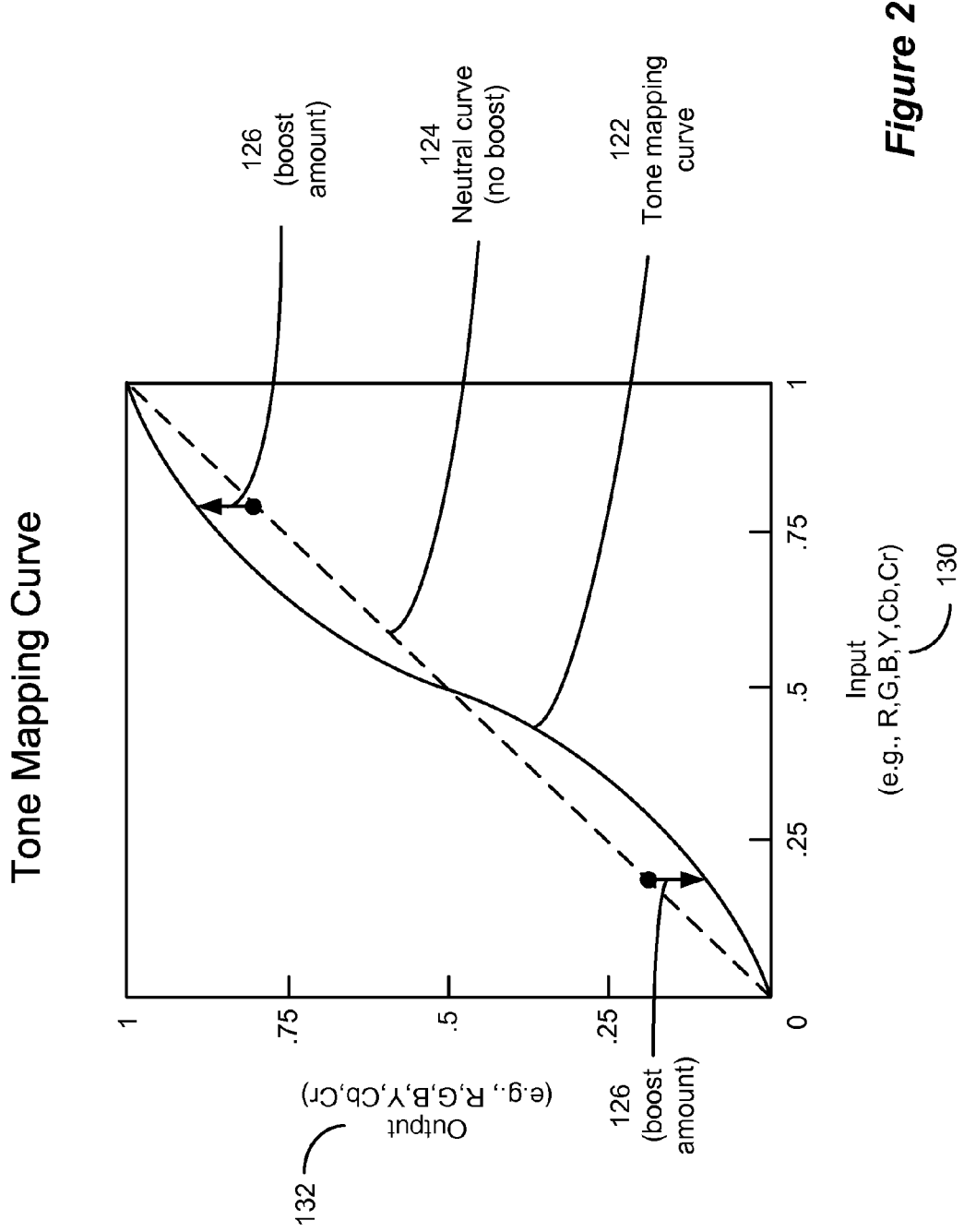
FIG. 2 illustrates a conventional tone mapping curve in accordance with one embodiment.

Referring now to FIG. 2, a conventional symmetric tone mapping curve 122 is shown. Along the x-axis 130 of the graph is the input value of some component of the input signal (e.g., luminance), normalized to a range of 0 to 1, with 0 representing the darkest pixels and 1 representing the brightest pixels. Along the y-axis 132 of the graph is the output value of some component of the output signal (e.g., luminance) that the image data will be mapped to, again normalized to a range of 0 to 1, with 0 representing the darkest pixels and 1 representing the brightest pixels.

Neutral curve 124 represents a tone curve that would provide no boost to the input image. In other words, neutral curve 124 has a linear slope of 1. For example, pixels with a relative luminance value of 0.25 would stay at 0.25 in the output image; pixels with a relative luminance value of 0.75 would stay at 0.75 in the output image, and so forth for any input luminance value. Neutral curve 124 is shown on the graph to give a reference for how much boosting tone mapping curve 122 provides in the various luminance input regions. The boosting amount 126 is shown at various points along tone mapping curve 122. Other suitable tone mapping curves may be used as well.

Figure 3:
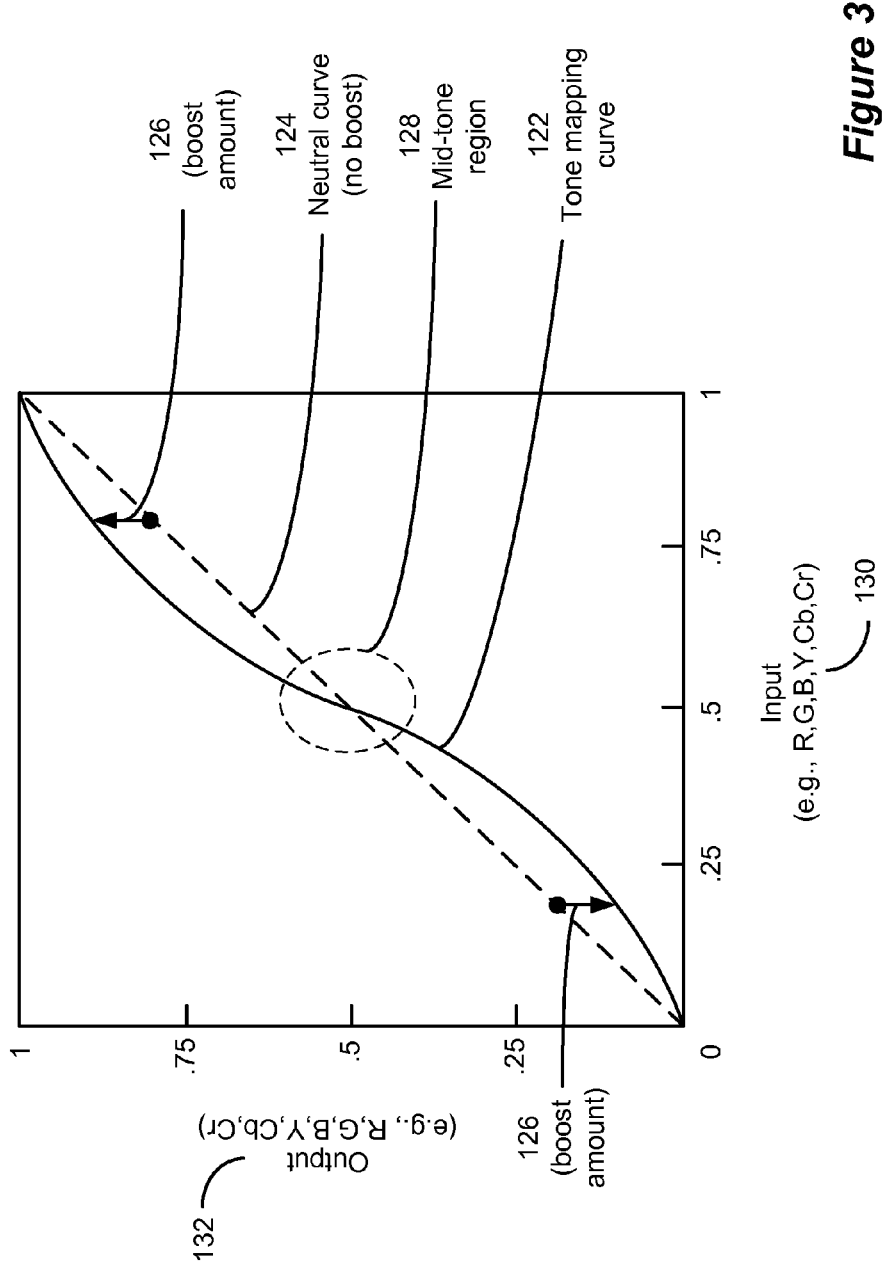
FIG. 3 illustrates the "mid-tone region" of a typical tone mapping curve in accordance with one embodiment.

Referring now to FIG. 3, the "mid-tone" region 128 of a conventional tone mapping curve 122 is shown. The mid-tone region represents one region where human skin tones may be likely to fall. During digital image processing, boosting may be applied in a component separable fashion, e.g., R, G, and B may be boosted separately if operating in RGB color space, and Cb and Cr may be boosted separately if operating in YCbCr color space. As mentioned above, skin tones tend to show visually unappealing effects when boosted in equal amounts to non-skin tones (from a user's perspective, non-skin tone regions do benefit from the application of a strong boosting function). With a conventional boost curve 122 such as that shown in FIG. 3, if a skin tone is not clustered around the "mid-tone" region 128 of the curve, its pixel value may be altered significantly by the boost operation, resulting in the aforementioned visually unappealing side effects.

Figure 4:
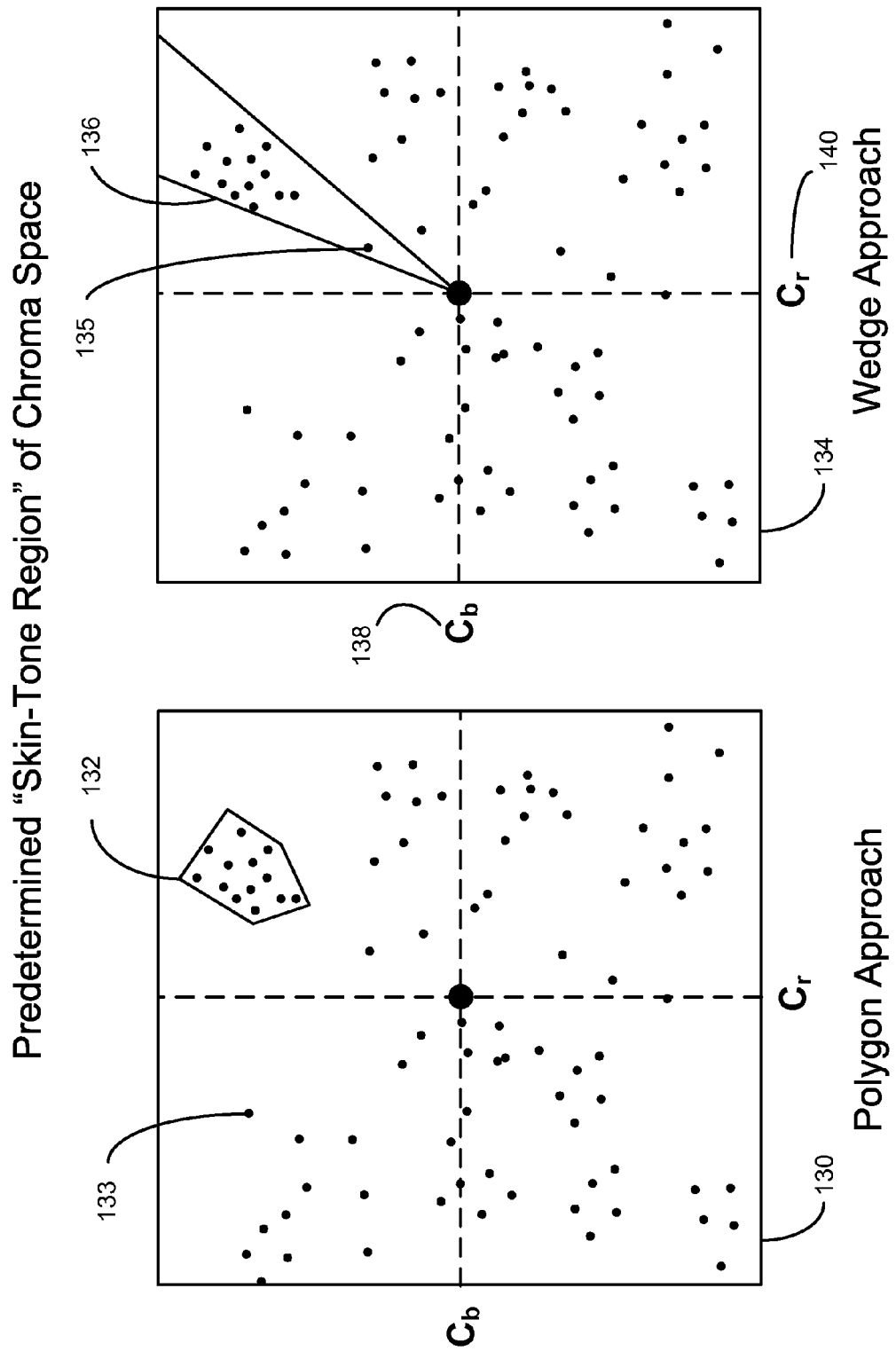
FIG. 4 illustrates a predetermined "skin-tone region" in chroma space in accordance with one embodiment.

Referring now to FIG. 4, a pair of chroma space maps 130 and 134 with a hypothetical array of points 133 representing pixels of a digital image are shown. The y-axes on the maps indicate ranges of blue chrominance data, Cb 138, and the x-axes on the maps represent ranges of red chrominance data, Cr 140. Tonal values that correspond to skin tones may be predetermined, and the boundary parameters of such a "skin-tone" region may be programmed into the memory of improved processing unit 142, for example (See FIG. 11). In chroma map 130, labeled as "Polygon Approach," the defined skin tone region 132 is indicated by a convex polygon. Alternately, in chroma map 134, labeled as "Wedge Approach," the defined skin tone region 136 is indicated by a wedge emanating from the center of the map. Each approach to chroma space skin tone region determination has its own advantages. For instance, the polygon approach is more accurate, but is more computationally expensive. The greater the number of sides in the region-defining polygon 132, the more computationally expensive it is to implement an algorithm that, given a pixel's Cb and Cr values, can determine whether or not the pixel falls within the region-defining polygon. On the other hand, the wedge approach to defining the skin tone region is less accurate (e.g., it would consider a pixel with Cb and Cr values equal to those of pixel 135 to be a skin tone, even though it likely would not be a skin tone), but it is more susceptible to implementation via vector processing, and thus processing unit 142 can carry out the necessary calculations very rapidly. SSE and NEON are two example of Single Instruction, Multiple Data (SIMD) instruction sets which may be used in the vector processing described above. SIMD instructions sets allow the same operation to be performed on several pieces of data concurrently. For example, with vectors that are 16 bytes in size, the Cb and Cr data for 8 pixels at a time may be stored in a single vector. Other techniques for defining the boundaries of skin tone regions may be used as well.

Figure 5:
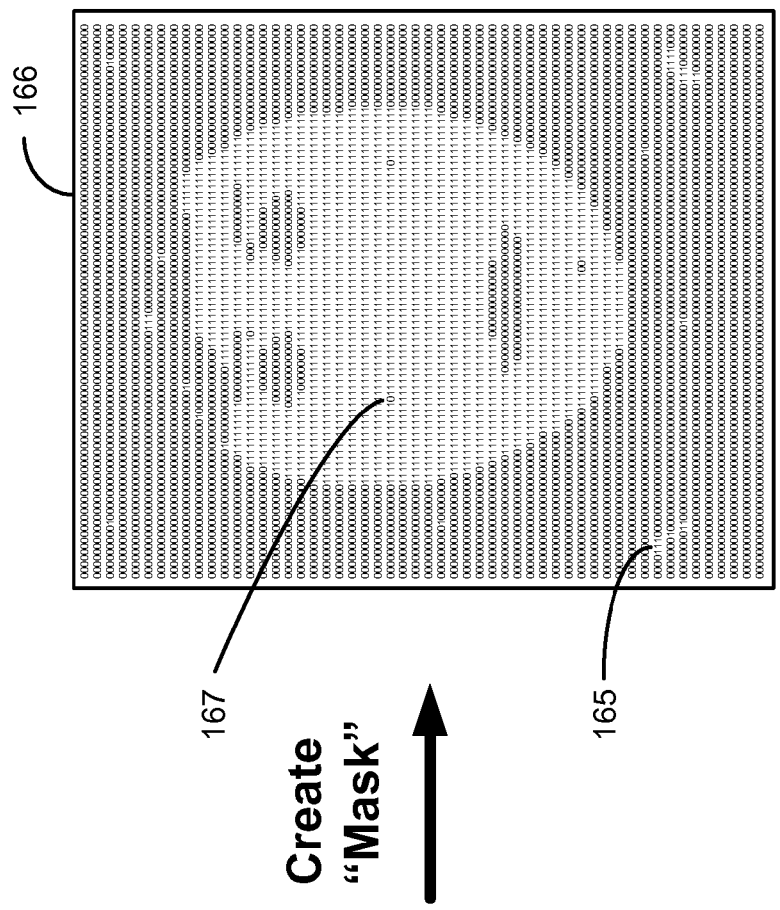
FIG. 5 illustrates a skin tone mask created for a digital image in accordance with one embodiment.
Figure 5:
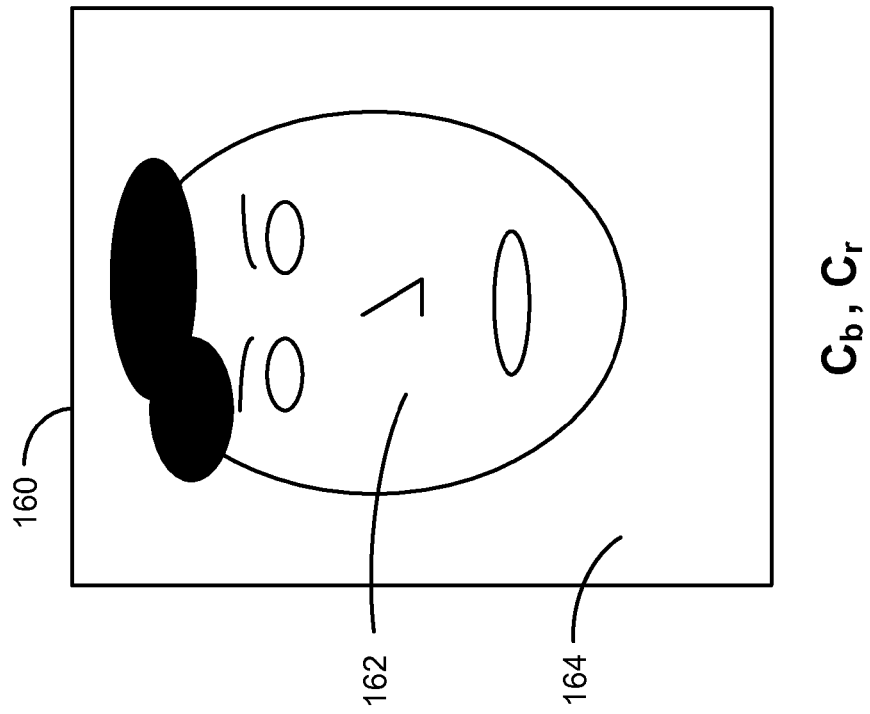

Referring now to FIG. 5, a hypothetical image 160 is shown with both skin tone 162 and non-skin tone regions 164. In this example, the mask 166 will be created based on the image's chrominance data, i.e., its Cb and Cr values. Specifically, processing unit 142 will examine each sampled chrominance value from the hypothetical image 160 and, in one embodiment, via vector processing, will determine whether the sampled Cb and Cr values place the pixel inside or outside of the a predetermined skin tone region (e.g., 132 or 136).

In one embodiment, should it be determined that the pixel falls within the predetermined skin tone region, it will be assigned a mask value of '1,' indicating that it likely represents a skin tone in the image and should be masked out of any subsequent large image boosting process. Should it instead be determined that the pixel falls outside of the predetermined skin tone region, it will be assigned a mask value of '0,' indicating that it does not represent a skin tone in the image and should be included in any subsequent large image boosting process. The stray 1's 165 in the mask that do not appear to be located over a skin tone region, as well as the stray 0's 167 in the mask that do not appear to be located over a non-skin tone region, represent minor outliers and holes in the mask where the chrominance data for the pixel region suggested that it was likely a skin tone even though it really was not, or vice versa. These areas in the map can be corrected for during the blurring process, as is described below with reference to FIG. 6, and they will not have a large effect on the final image output.

In another embodiment (not pictured), the mask determination decision doesn't need to be binary. In other words, there could be a "feathered" border around the predetermined skin tone region, wherein pixels whose color values fall in the feathered border region could be assigned fractional mask values ranging between 0 and 1, representing how "close" the pixel's color was to the predetermined skin tone region. Such an embodiment could use the distance between the pixel and the predetermined skin tone region to compute a feathered mask value, which could, for example, gradually increase from 0 to 1 as the color of the pixel became closer to the skin tone region.

Figure 6:
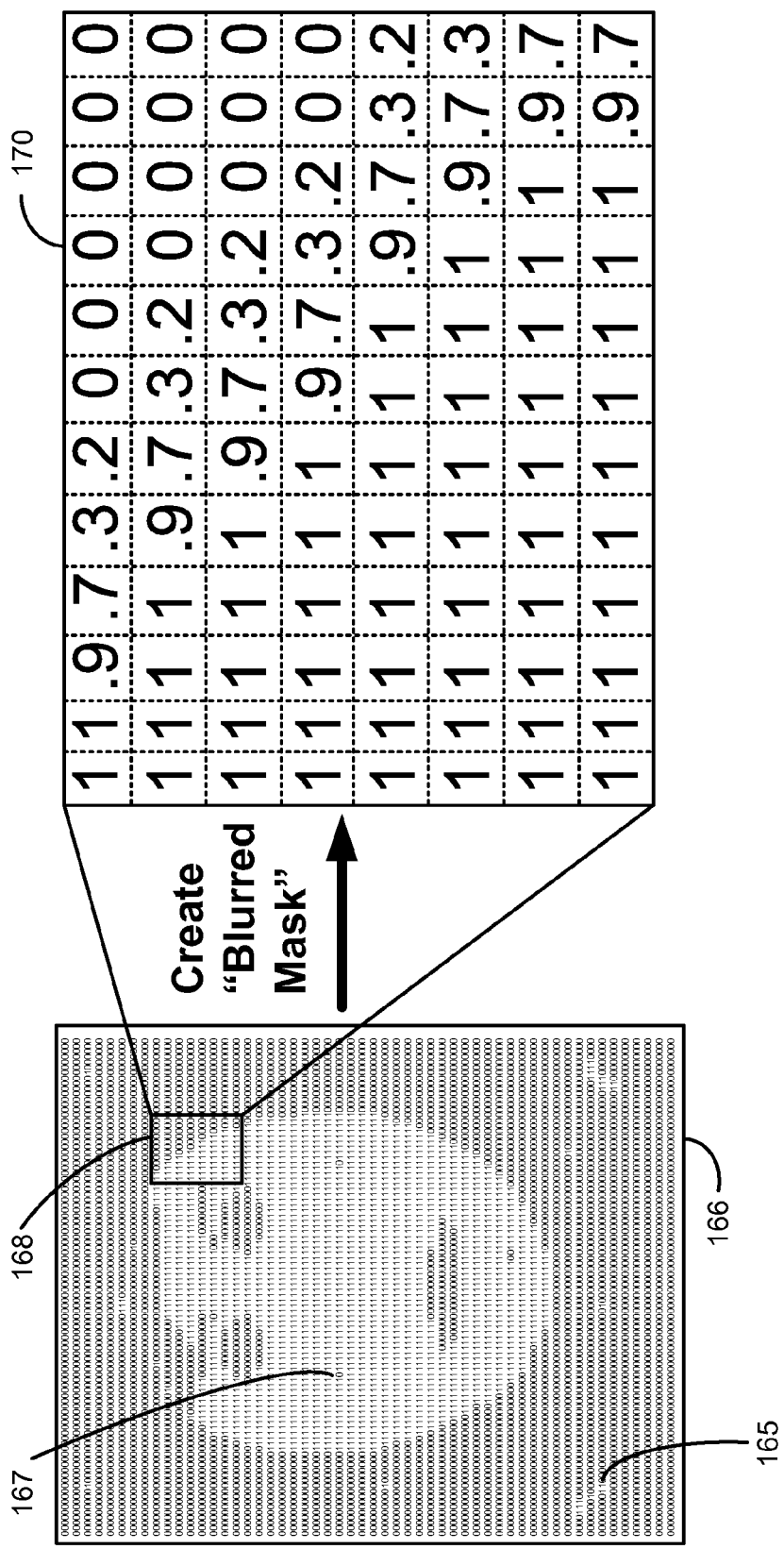
FIG. 6 illustrates a blurred skin tone mask created for a digital image in accordance with one embodiment.

Referring now to FIG. 6, a hypothetical blurred mask 170 for a portion 168 of image mask 166 is shown. Once processing unit 142 has classified each pixel of image 160 as either "mask" or "non-mask" (or some degree thereof) and set the pixels' mask values accordingly, it performs any of a number of well-known blur techniques, such as a Gaussian blur, over the mask values to account for outliers and holes in the mask and to soften the boundary between the skin tone and non-skin tone regions of the image. Typical blur radii may be three to six pixels. Looking at the portion of hypothetical blurred mask 170, it can be seen that the hard boundary between the skin tone region, e.g., the '1's in the mask, and the non-skin tone region, e.g., the '0's in the mask, has been softened somewhat by the exemplary blurring function. Any blurring algorithm may be used, and the values shown in blurred mask 170 are purely exemplary and are not indicative of any actual blurring function's output.

Figure 7:
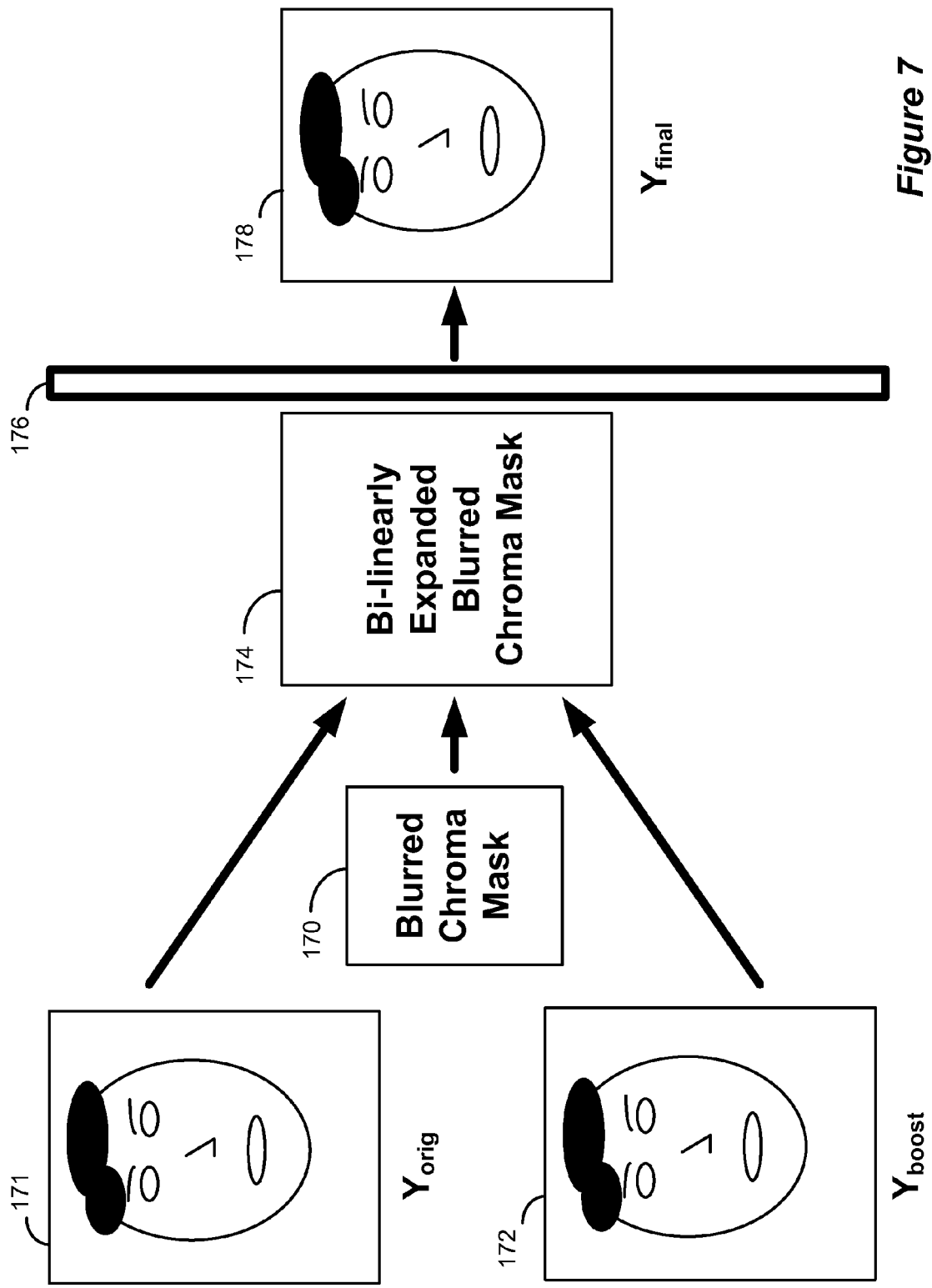
FIG. 7 illustrates one embodiment of a process for carrying out skin tone aware color boosting in accordance with one embodiment.

Referring now to FIG. 7, one embodiment of a process for carrying out skin tone aware color boosting is illustrated. As mentioned above, one embodiment of skin tone aware color boosting involves carrying out two separate color boosting operations over the entire image. In the illustrated embodiment, at least one of the boosting operations may be done in a different component of the color space, i.e., the luminance, or Y-space, than the masking was done in, i.e., the chroma space. It would also be possible to perform the boosting in the same color space that the masking was done in. One color boosting operation will typically have a smaller effect on the image, and the other color boosting operation will have a larger effect on the image. A final boosted version of the image is then created, applying the pixel values resulting from the smaller boosting operation to the skin tone regions of the image and applying the pixel values resulting from the larger boosting operation to the non-skin tone regions of the image, using the blurred mask to provide a smooth transition between the skin tone and non-skin tone regions, as will be described below in reference to Equation 1. As illustrated in FIG. 7, the result of the small boosting operation is labeled $Y_{orig}$ and numbered 171. $Y_{orig}$ 171 may be the output of, for example, RGB contrast and saturation boost process 108 within ISP 100. Alternatively, RGB contrast and saturation boost process 108 may be skipped, and $Y_{orig}$ 171 may reflect the original image as captured by sensor 102. The result of the larger boosting operation is labeled $Y_{boost}$ and numbered 172. $Y_{boost}$ 172 may be the output of, for example, the application in YCbCr color space of tone mapping curve 122 (or any other suitable tone mapping curve) to the image's luminance data within CPU 142.

Because 4:2:0 subsampled CbCr data is sampled at half of the vertical resolution and half of the horizontal resolution of the luminance data, the blurred chroma mask 170 may need to be bi-linearly expanded, i.e., expanded and interpolated two-fold in both the vertical and horizontal directions, so that there is a corresponding value in the resultant bi-linearly expanded blurred chroma mask 174 for every luminance value in $Y_{orig}$ 171 and $Y_{boost}$ 172. Once bi-linearly expanded blurred chroma mask 174 has been created, it can be applied to the image data through masking process 176 to create $Y_{final}$ 178, in accordance with the following equation:

$$Y_{final(x,y)} = Y_{orig(x,y)} + (1 - Mask_{(x,y)})(Y_{boost(x,y)} - Y_{orig(x,y)}) \quad \text{(Eqn. 1)},$$

wherein the value of the Mask at each point, (x,y), is between zero and one, inclusive, and Y can refer to whichever component of the color space is being boosted by the tone mapping curve, in this case, luminance values.

Application of Equation 1 has the effect of setting the luminance value for each pixel that is "in" the mask (i.e., a skin tone) to the luminance value of the corresponding pixel in $Y_{orig}$ (i.e., small boost or no boost) and setting the luminance value for each pixel that is "not in" the mask (i.e., not a skin tone) to the luminance value of the corresponding pixel in $Y_{boost}$ (i.e., highly boosted). For those pixels whose mask value is somewhere between completely masked and completely unmasked, i.e., having a mask value between zero and one, Equation 1 above will have the effect of boosting the pixel's luminance value by an amount proportional to the difference between the $Y_{boost}$ and the $Y_{orig}$ values for that pixel. In other words, Equation 1 effectively calculates a $Y_{final}$ value that is the result of blending the original $Y_{boost}$ and $Y_{orig}$ values together according to a predetermined formula. For example, if a given pixel's blurred mask value was 0.8, its luminance value in $Y_{final}$ would be equal to its $Y_{orig}$ value boosted by only 20% of the difference between the $Y_{boost}$ and the $Y_{orig}$ values for that pixel. The resultant image, labeled $Y_{final}$ and numbered 178 represents a visually pleasing image that has been sufficiently boosted, but not over-boosted in the areas representing skin tone regions.

Figure 8:
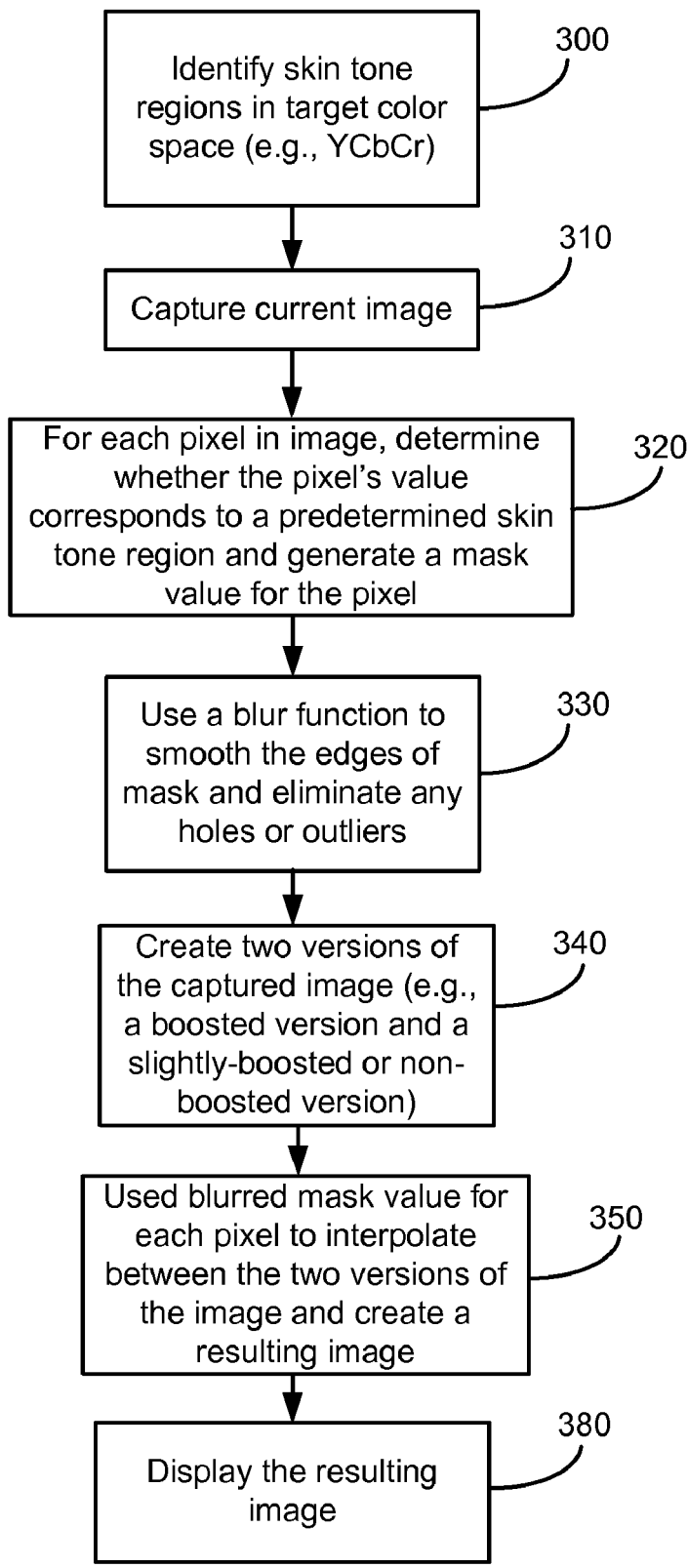
FIG. 8 illustrates, in flowchart form, one embodiment of a process for skin tone aware color boosting in accordance with one embodiment.

Referring now to FIG. 8, one embodiment of a process for skin tone aware color boosting is illustrated in flowchart form. First, regions in the target color space, e.g., YCbCr, corresponding to skin tones may be empirically identified and stored in a memory unit programmed to carry out the following steps (step 300). As mentioned above, these skin tone regions may be mapped as, for example, polygonal or wedge-shaped areas. Next, digital camera sensor 102 captures the current image frame (step 310). Next, for each pixel in the image, the processor unit 142 may determine whether the pixel's value corresponds to a skin tone region and then generate a skin tone mask of values 166 representative of the captured image and comprising mask values for each sampled pixel (step 320). The skin tone mask of values 166 may then be provided to a blurring function to smooth the edges of the mask and eliminate any holes or outliers in the mask (step 330). It should be noted that it is possible to carry out the mask generation (step 320) and blurring (step 330) steps either before or after the generation of the two versions of the captured image (step 340). Next, two versions of the captured image may be created, e.g., one strongly-boosted image, and one slightly-boosted or non-boosted version of the image (step 340). Finally, the blurred mask pixel values are applied according to Equation 1 above or any other equation that can interpolate between the two created versions of the captured image (step 350), and the resultant image may then be displayed by the device (step 380).

Figure 9:
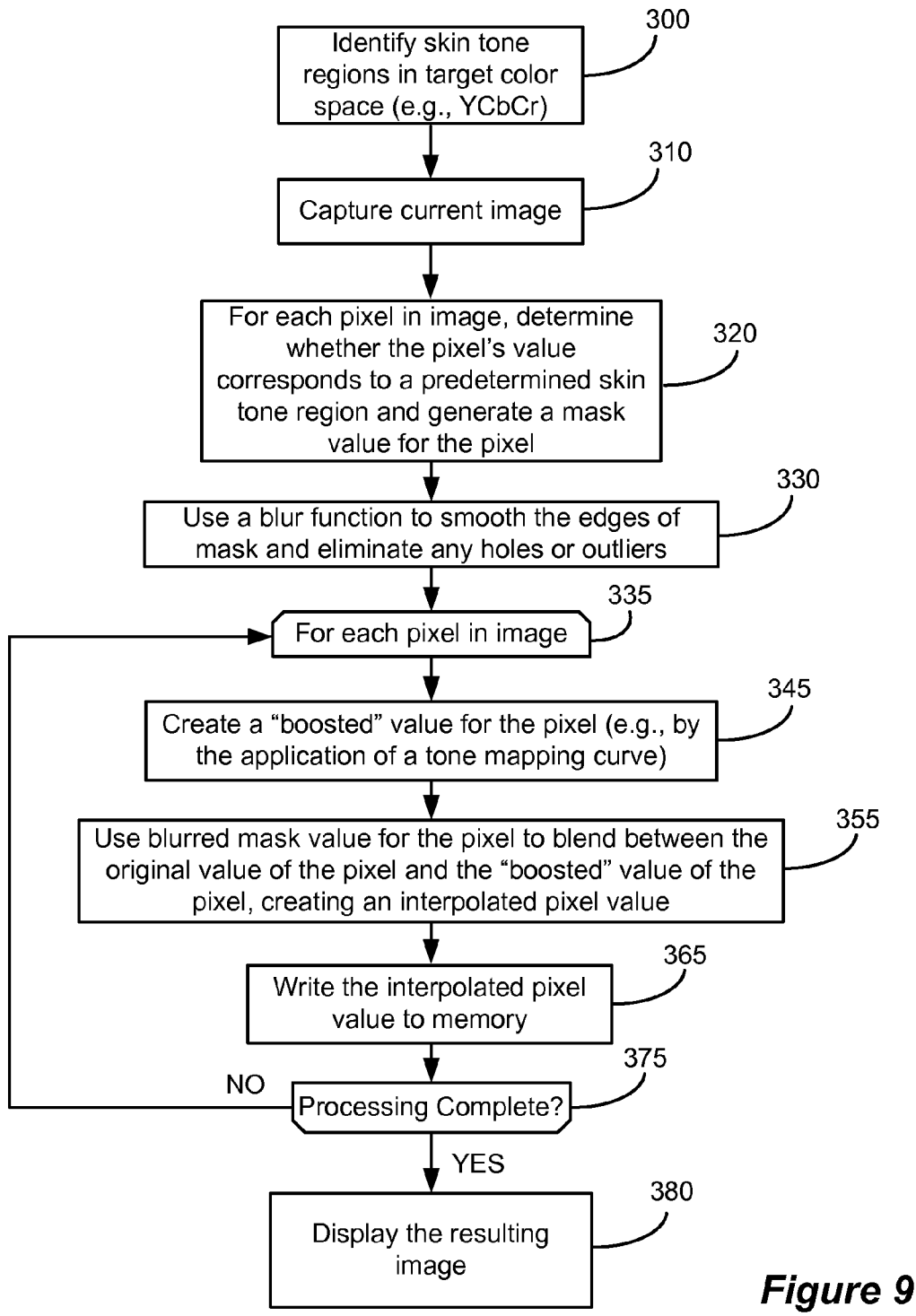
FIG. 9 illustrates, in flowchart form, one embodiment of a process for skin tone aware color boosting in accordance with one embodiment.

In another implementation of the method, depicted in FIG. 9, the creation of the boosted version of the image and the application of the blurred mask pixel values may be carried out in a single processing pass over the data. As in FIG. 8, the method begins when digital camera sensor 102 captures the current image frame (step 310). Next, for each pixel in the image, the processor unit 142 may determine whether the pixel's value corresponds to a skin tone region and then generate a skin tone mask of values 166 representative of the captured image and comprising mask values for each sampled pixel (step 320). The skin tone mask of values 166 may then be provided to a blurring function to smooth the edges of the mask and eliminate any holes or outliers in the mask (step 330). Next, a single processing pass over the image data may be started (Step 335). For example, the single pass over the image data may read in the original Y value of each pixel, $Y_{orig}$. Then, the tone mapping curve may be applied to each pixel's value to generate a second Y value, $Y_{boost}$ (Step 345). At that point, the blurred mask value may be used to blend between the two Y values to get $Y_{final}$ (Step 355), which may then written back to memory (Step 365). When the pass over the data is complete (Step 375), the resultant image may be displayed (Step 380). This implementation can avoid the need of having one or two extra Y planes, i.e., Y values for every pixel in the image, stored in memory at once, which could have a relevant performance cost in some systems.

Figure 10:
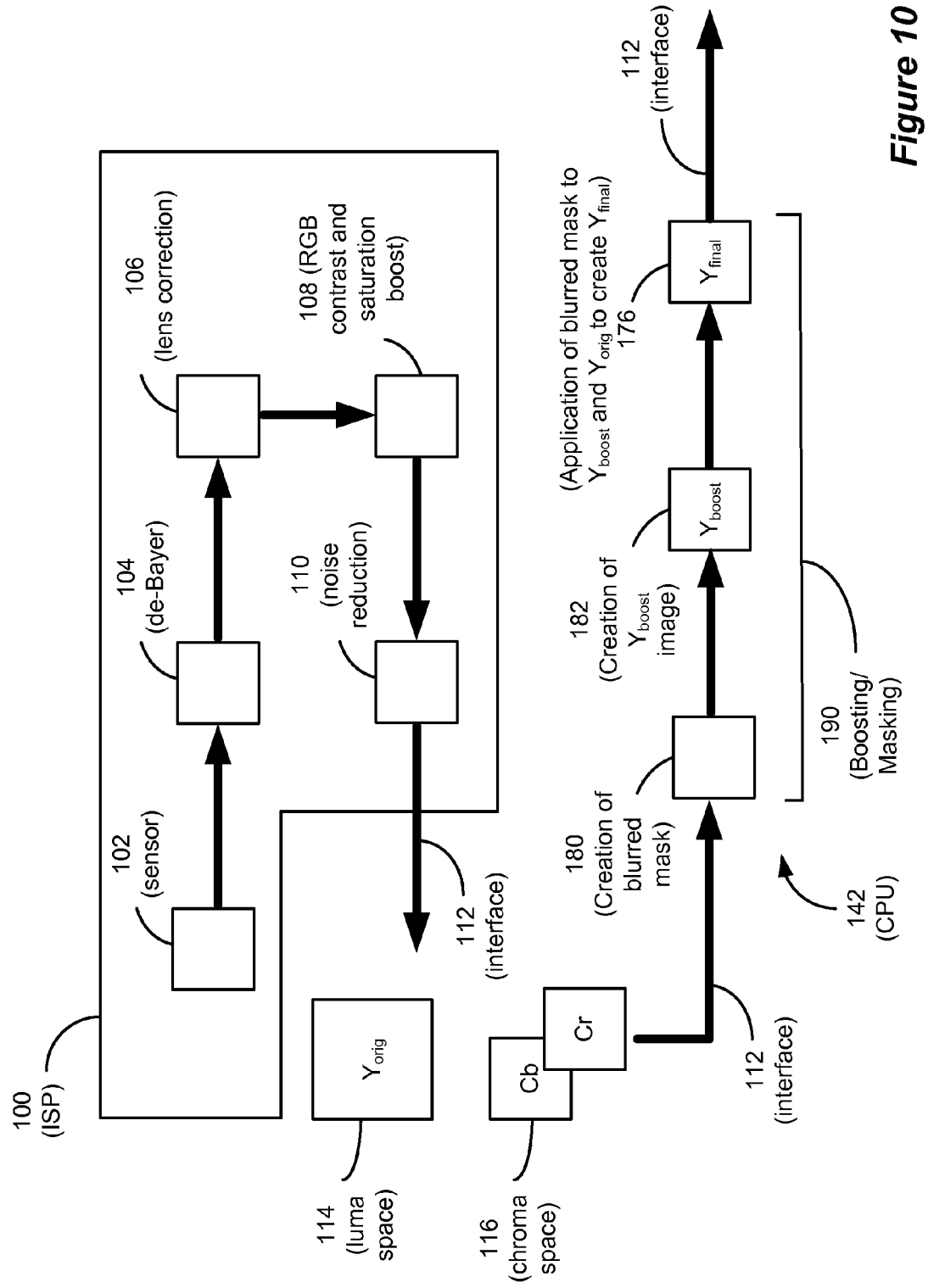
FIG. 10 illustrates an improved CPU for skin tone aware color boosting in accordance with one embodiment.

Referring now to FIG. 10, a block diagram of one embodiment of an improved processor unit 142 for skin tone aware color boosting is shown. The ISP 100 may include a digital image sensor 102, a demosaicing or de-Bayering process 104, a lens correction module 106, an RGB contrast and saturation boost process 108, and noise reduction filter 110. Finally, the image data may be encoded into the YCbCr family of color spaces and passed on to processing unit 142 for further processing. In the embodiment of FIG. 10, blurring module 180 creates a blurred mask for the captured image as described above, using a Fast Gaussian blur, for example. Boosting module 182 applies, for example, a tone mapping curve to the luminance data of the image, storing the resultant image in memory 144 (See FIG. 11). Then, the blurred mask may be expanded to be the same size as the boosted image data (if necessary), and masked through process 176 in accordance with Equation 1, for example, as described above. As mentioned above with respect to FIG. 9, modules 182 and 176 may also carry out their processing at the same time for each pixel so that only a single pass is made over the image data. Also, creation of the blurred mask 180 may occur before or after the boosting operation 182. Finally, the resultant image, $Y_{final}$, may be passed over interface 112 for any further processing and/or display by the device.

Figure 11:
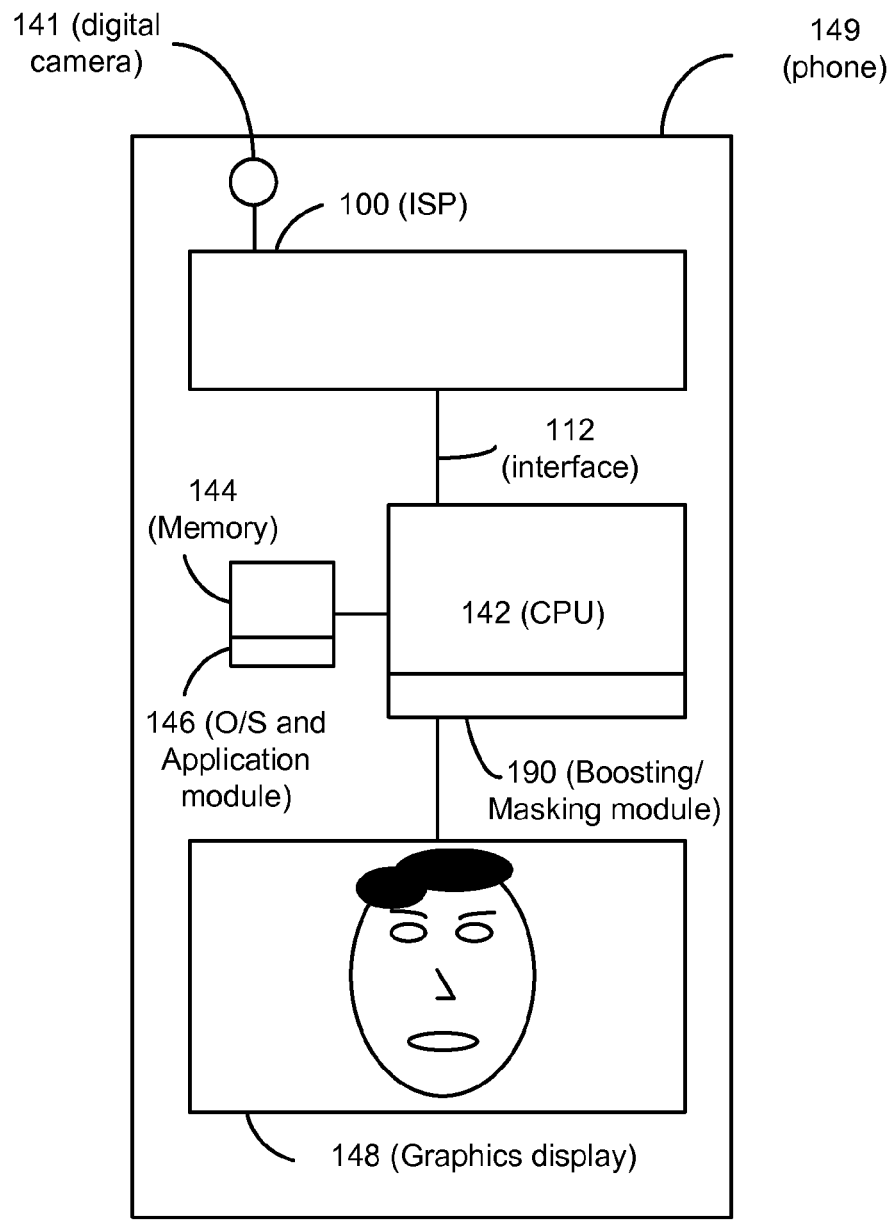
FIG. 11 illustrates one embodiment of an apparatus possessing an improved CPU for skin tone aware color boosting in accordance with one embodiment.

Referring now to FIG. 11, one embodiment of an apparatus possessing an improved processing unit 142 programmed to carry out instructions for skin tone aware color boosting is shown. In this embodiment, a digital camera comprising a camera sensor unit 141 configured for taking still images or video may be integrated into a multimedia device, such as a mobile phone 149. ISP 100 may communicate with mobile phone 149's central processing unit (CPU) 142 via data interface 112. CPU 142 may communicate with memory unit 144, which, for example, stores the necessary predetermined image processing constants, e.g., the boundaries of the skin-tone region in the desired color space. Memory unit 144 is also one example of a computer readable medium wherein instructions for carrying out the skin tone aware color boosting procedure described above may be stored (i.e., tangibly embodied), and it may consist of ROM, EEPROM, Flash memory, or any other suitable type of memory storage medium. Within memory unit 144 may be operating system and application module 146, which provides operating system services and the framework for other applications and services offered by phone 141, e.g., word processing, address book, email, telephone, and photo viewing applications. The image data output from ISP 100 may then be sent to the CPU 142's Boosting/Masking module 190, which may carry out the skin tone aware color boosting process described herein, and the resultant data may then be sent out over data interface 112 to phone 149's graphic display module 148 so that the image can be rapidly displayed to the user with visually appealing color tone boosting. Any of the blocks shown in FIG. 11 may potentially be consolidated, even though shown separately in FIG. 11. For example, blocks 144 and 146 may be consolidated with block 142. In other embodiments, the digital camera may be embedded in any of a variety of electronic consumer devices, e.g., digital cameras, digital video cameras, PDAs, portable music players, and desktop or laptop computers, whose processors may be similarly programmed to perform the skin tone aware color boosting techniques described herein.

The foregoing description of preferred and other embodiments is not intended to limit or restrict the scope or applicability of the inventive concepts conceived of by the Applicants. As one example, although the present disclosure focused on the YCbCr color space, it will be appreciated that the teachings of the present disclosure can be applied to other implementations of color spaces. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer processor programmed to perform an image processing method, the method comprising:
   receiving a first image representative of a physical scene and comprising a plurality of image pixels, wherein each image pixel comprises a first value;
   transforming the plurality of image pixels through the application of a first boosting operation, wherein the first boosting operation generates a second value for each image pixel in the plurality of image pixels; and
   generating a third value for each image pixel in the plurality of image pixels,
   wherein the act of generating a third value for each image pixel in the plurality of image pixels comprises blending between the first value and the second value of each image pixel in the plurality of image pixels in accordance with a mask, and
   wherein the mask comprises a plurality of mask pixels, wherein each mask pixel comprises a mask value, and
   wherein each mask pixel has a corresponding image pixel, and
   wherein the mask value of a mask pixel is determined at least in part by whether the first value of the mask pixel's corresponding image pixel falls within a previously defined range.

2. The processor of claim 1, wherein the processor is further programmed to perform the act of blurring the mask.

3. The processor of claim 2, wherein the act of blurring the mask comprises using a Gaussian blur.

4. The processor of claim 1, wherein the previously defined range corresponds to human skin tones.

5. The processor of claim 4, wherein the shape of the previously defined range comprises a wedge in CbCr space.

6. The processor of claim 4, wherein the shape of the previously defined range comprises a convex polygon in CbCr space.

7. The processor of claim 1, wherein the first value, second value, and third value of each image pixel comprise luminance values.

8. The processor of claim 1, wherein the act of receiving a first image representative of a physical scene comprises receiving an image from at least one of the following: a digital camera, digital video camera, mobile phone, personal data assistant, portable music player, and computer.

9. The processor of claim 1, wherein the first image has had a second boosting operation performed on it before being received.

10. A method of image processing, comprising:
receiving a first image representative of a physical scene and comprising a plurality of pixels;
transforming the first image through the application of a first boosting operation, wherein the first boosting operation generates a second image representative of the physical scene and comprising a plurality of pixels;
generating a mask comprising a plurality of mask pixels corresponding to the plurality of pixels of the first image, wherein generating the mask comprises, for each pixel in the first image:
generating a mask value for the corresponding mask pixel, wherein the mask value is determined at least in part by whether a color value of the pixel is within a previously defined color range; and
generating a combined image representative of the physical scene and having a plurality of pixels corresponding to the pixels of the first and second images and the mask, wherein generating the combined image comprises, for each pixel in the combined image:
computing a final luminance value of the pixel as a function of the luminance values of corresponding pixels in the first and second images and a corresponding mask value.

11. The method of claim 10, further comprising the act of blurring the mask.

12. The method of claim 11, wherein the act of blurring the mask comprises using a Gaussian blur.

13. The method of claim 10, wherein the previously defined color range comprises a range corresponding to human skin tones.

14. The method of claim 13, wherein the shape of the previously defined color range comprises a wedge in CbCr space.

15. The method of claim 13, wherein the shape of the previously defined color range comprises a convex polygon in CbCr space.

16. The method of claim 10, wherein the first image has had a second boosting operation performed on it before being received.

17. The method of claim 10, wherein the act of receiving a first image representative of a physical scene comprises receiving an image from at least one of the following: a digital camera, digital video camera, mobile phone, personal data assistant, portable music player, and computer.

18. An apparatus, comprising:
a camera sensor unit;
memory operatively coupled to the camera sensor unit for receiving a first image representative of a physical scene and comprising a plurality of pixels from the camera sensor unit; and
a processor unit operatively coupled to the memory, the memory comprising instructions for causing the processor unit to:
generate a second image representative of the physical scene by performing a first boosting operation on the first image;
for each pixel in chrominance space of the first image:
obtain Cb and Cr values for the pixel;
determine whether the Cb and Cr values are within a previously defined skin tone range in chroma space; and
generate a mask value for the pixel, wherein the mask value is determined at least in part by whether the determined color value is within the previously defined color range, and wherein the collection of mask values comprises a mask; and
for each pixel in luminance space of the first and second images:
generate a final luminance pixel value by transforming a first luminance pixel value in the first image and a corresponding first luminance pixel value in the second image according to a function relating at least the luminance pixel values of the first and second images and a corresponding mask value, wherein the collection of final luminance pixel values comprises a third image representative of the physical scene.

19. The apparatus of claim 18, wherein the processor unit is further programmed to blur the mask.

20. The apparatus of claim 19, wherein the act of blurring the mask further comprises using a Gaussian blur.

21. The apparatus of claim 18, wherein the shape of the previously defined color range comprises a wedge in CbCr space.

22. The apparatus of claim 18, wherein the shape of the previously defined color range comprises a convex polygon in CbCr space.

23. The apparatus of claim 18, wherein the image has had a second boosting operation performed on it before being received.

24. The apparatus of claim 18, wherein the apparatus comprises at least one of the following: a digital camera, digital video camera, mobile phone, personal data assistant, portable music player, and computer.

25. A computer usable medium having a computer readable program code embodied therein, wherein the computer readable program code is adapted to be executed to implement the method performed by the programmed computer processor of claim 1.

* * * * *